United States Patent

[11] 3,612,813

| [72] | Inventor | Francis C. Gerath<br>Canton, Conn. |
|---|---|---|
| [21] | Appl. No. | 33,443 |
| [22] | Filed | Apr. 29, 1970 |
| [45] | Patented | Oct. 12, 1971 |
| [73] | Assignee | United Aircraft Corporation<br>East Hartford, Conn. |

[54] METHOD OF FORMING A LIGHTWEIGHT METAL SANDWICH HAVING A HONEYCOMB CORE
4 Claims, 9 Drawing Figs.

| [52] | U.S. Cl. | 219/117 HD |
|---|---|---|
| [51] | Int. Cl. | B23k 11/06 |
| [50] | Field of Search | 219/117, 107, 119 |

[56] References Cited
UNITED STATES PATENTS

| 1,850,454 | 3/1932 | Gross | 219/117 HD |
|---|---|---|---|
| 2,324,435 | 7/1943 | Smith | 219/117 HD |
| 2,881,304 | 4/1959 | Dobson et al. | 219/117 HD |
| Re. 26,287 | 10/1967 | Wasilisin et al. | 219/117 HD |

Primary Examiner—J. V. Truhe
Assistant Examiner—J. G. Smith
Attorney—Charles A. Warren ABSTRACT: A sheet of honeycomb sandwich structure having flat exterior surfaces and internal cooling passages is constructed by the electric-resistance welding of outer sheets of flat metal to a center core of corrugated metal. The resistance welds are accomplished using electrically conductive shunt bars which have a contact area proportioned to provide a current density of sufficient intensity to cause a local heating and fusion between the corrugated metal and the flat metal sheet.

PATENTED OCT 12 1971  3,612,813

INVENTOR
FRANCIS C. GERATH

BY Charles A. Warren
ATTORNEY

METHOD OF FORMING A LIGHTWEIGHT METAL SANDWICH HAVING A HONEYCOMB CORE

BACKGROUND OF THE INVENTION

1. Field of the Invention

This invention relates to lightweight construction materials having internal passages and more particularly to lightweight materials having internal passages for use in gas turbine engines.

2. Description of the Prior Art

The metal working industry is constantly in search of materials which can be produced economically and withstand greater stresses while exposed to higher temperature environments. In various high-temperature applications, particularly lightweight power-generation equipment, sheet material, honeycomblike in cross section, has been found useful and practical. Such materials can be formed into structures having a high strength-to-weight ratio and the internal passages inherent in the honeycomb can be used to direct cooling fluid through the hotter sections of the metal structure. One material of the type described is available under the trademark FINWALL™ and it is used in advanced jet engines, particularly jet engine burners. The ability to internally cool this material allows the component made thereof to be exposed to higher environmental temperatures without the surface temperature of the material reaching the temperature it otherwise would in the absence of cooling.

Honeycomb structures are made presently by either diffusion bonding or brazing techniques. The brazed structure is limited in its application by the integrity of the brazed material; if the operating temperature is too high, the brazed bond looses its strength. In gas turbine burner applications, brazed construction is unacceptable because the hot gases in the burners heat the brazed joints beyond the temperature at which they retain structural integrity. Therefore, diffusion bonding has been used extensively for such applications since it forms welded joints and allows the fabrication of a material capable of withstanding much higher temperatures. However, diffusion bonding is a relatively involved and expensive procedure; the materials to be bonded often require nickel plating before bonding. Also to avoid oxidation the entire structure to be bonded must be placed in a high-temperature furnace having a special atmosphere such as argon, helium or vacuum. In addition, facilities must be provided inside the furnace to apply heat and pressure to the plated surfaces to be diffusion bonded. When relatively large sheets (generally several feet on a side) are prepared in this manner, the total force applied to the large sheet to provide the necessary pressure at the weld zones is substantial. Further, it has been found that the large sheets tend to distort and create poor welds when the relatively large surface areas are subjected to the necessary pressure, although the amount of distortion has been reduced by pressing several stacked sheets simultaneously. An additional disadvantage to the diffusion-bonding process is that the press required must be fitted within the high-temperature-controlled atmosphere furnace; this is a complicated, cumbersome and generally undesirable procedure. The inspection technique required for quality control of production items fabricated by diffusion bonding has been found to be relatively slow and expensive.

SUMMARY OF THE INVENTION

An object of this invention is to weld thin sheets of metal into a sandwich structure having flat exterior surfaces and a corrugated core.

According to the present invention, an aggregation of thin metal sheets is welded into a flat sandwich structure having smooth external surfaces and a honeycomb core by passing said metal sheets between a pair of current-carrying electrodes, the sheets comprising flat surface sheets and corrugated core sheets, the latter supporting electrically conducting shunt bars in said corrugations during fabrication of the structure, the shunt bars having a tapered cross section area sufficient to cause the welding current density in a preselected region of the thin metal structure to melt and weld said flat sheets to said corrugated sheets forming said sandwich structure.

In accord with this invention, the core of the sandwich structure has passages which can allow cooling of the external surfaces by the transport of cool fluid through said passages. Further, the weld process permits a relatively inexpensive construction; this invention eliminates the need for a considerable amount of tooling or the furnace volume inherent in diffusion-bonding techniques. Still further, construction in accordance with the present invention provides a joint superior to a diffusion-bonded joint. Another advantage of this invention is found in the relative ease with which the integrity of the weld points may be checked.

The foregoing and other objects, features and advantages of the present invention will become more apparent in the light of the following detailed description of preferred embodiments thereof as illustrated in the accompanying drawings.

DESCRIPTION OF THE PREFERRED EMBODIMENT

The joining of thin metal sheets by high-quality welds requires a delicate balance between delivering enough energy to the weld zones to cause melting and subsequent fusing of the principal components, and avoiding delivery of excess amounts of energy that cause uncontrolled melting and destruction of these metal sheets in the weld zones. Through the teachings of the instant invention, high-quality electric-resistance welding between a thin sheet of corrugated metal and thin sheets of flat metal to form a sandwich structure having a honeycomb core and internal passageways is possible.

Figure 1A:
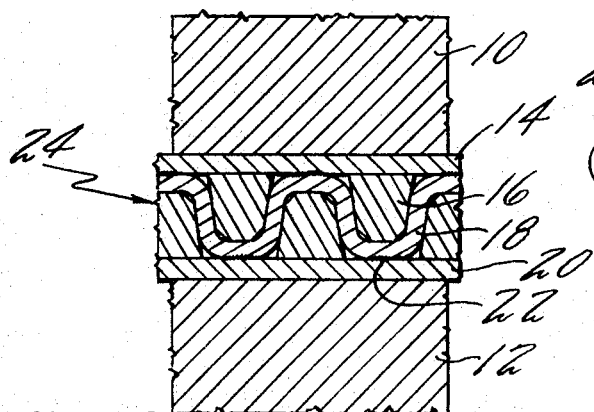
FIG. 1A is a partially broken-away, cross-sectional view through a slab of sandwich structure between two electrodes in accordance with the present invention.

Referring to the drawings, the welding of a typical structure between two electrodes is shown schematically in FIG. 1A. Electric current passes from an upper wheel electrode 10 to a lower wheel electrode 12 by flowing through an outer or upper flat sheet 14, shunt bars 16, a center or corrugated sheet 18 and an outer or lower flat sheet 20, forming local weld regions 22 and resulting in an overall sandwich structure 24. The sandwich structure 24 comprises the corrugated sheet 18 welded between the outer sheet 14, 20, with the shunt bars 16 removed after the welding has been completed. A workable welding configuration comprised of two wheel electrodes is shown schematically in side elevation in FIG. 1B. The sandwich structure 24 is advanced in the direction 25 between the electrodes 10, 12, which are rotating in the respective directions 27, 29, by the motion of these electrodes which are electrically connected across a power supply 26.

Figure 2A:
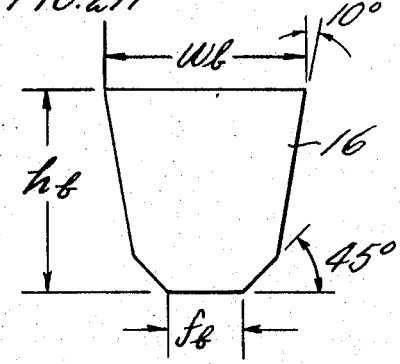
FIG. 2A is a front elevation view of a shunt bar in accordance with the present invention.
Figure 2B:
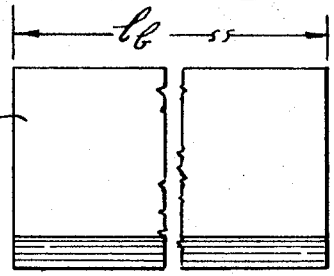
FIG. 2B is a side elevation view of a shunt bar in accordance with the present invention.

FIG. 2A and FIG. 2B are the front elevation and side elevation respectively of the shunt bar 16 in accordance with the present invention having a trapezoidallike cross section and machined out of a piece of copper bar stock. The overall dimensions of any given shunt bar are determined by the thickness of the metal sheet to be welded and the size of the passages to be maintained through the core of the final structure. The shunt bar 16 shown in FIGS. 2A and 2B has a height $h_b$ of 45 mils, a width $w_b$ of 45 mils, a face width $f_b$ of 18 mils and a length $l_b$ of 2⅞ inches and it has been found to perform satisfactorily in the manufacture of a 2⅞ inches-long metal sandwich from flat plates 18 mils in thickness, and a corrugated plate 12 mils in thickness. The length $l_b$, of the shunt bar 16 will correspond to the length of the sandwich structure weld desired, the longer the sandwich desired the longer the shunt bar used.

While the shunt bar 16 shown in FIG. 2A and 2B is a preferred embodiment, alternate shunt configurations are possible and sometimes very desirable. For example, shunt bars made of copper drawn through dies in a wire-making-type process have been used successfully in the present invention. The wire is drawn to a desired trapezoidal configuration in a continuous fashion and then cut to length as is needed. The bars made in this manner have had the same general cross section and produced the same weld characteristic as the shunt bars made by the machined process; however, the drawn shunts are produced much less expensively.

Figure 3A:
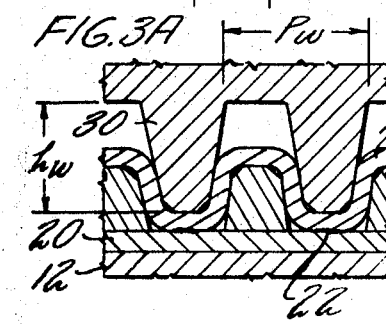
FIG. 3A is a partially broken-away, cross-sectional view through a slab of corrugated core and flat outer sheet being welded on a seam-welding wheel electrode in accordance with the present invention.
Figure 3B:
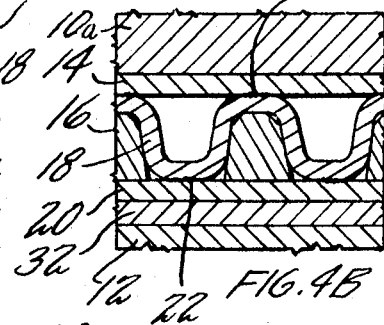
FIG. 3B is a partially broken-away, cross-sectional view through a slab of core and flat sheet being welded to a second flat sheet between two electrodes in accordance with the present invention.

During the practice of the present invention it was found that the insertion and removal of shunt bars 16 are time-consuming operations which are preferably avoided. The number of individual shunt bars necessarily handled in the described welding operation can be reduced by a factor of two if the welding is performed with specially prepared electrodes in the following two phases of welding procedure. The first welding phase is represented in FIG. 3A which shows a corrugated sheet 18 being welded to a lower flat sheet 20 between an upper electrode or seam-welding wheel 10a and a lower electrode 12. Although it is not necessary for welding purposes, the shunt bars 16 are placed in alternate corrugations during this phase of welding; it has been found that the shunt bars undergo less thermal distortion and are more readily reused if put into place at this point in the process. The seam-welding wheel 10a has machined ridges 30 which cause weld regions 22 to form between the corrugated sheet 18 and the flat sheet 20 when electric current passes therethrough. Each ridge 30 is of the same general trapezoidal cross section as the shunt bar 16 although the ridge height $h_w$ on the wheel 10a is 80 mils (somewhat greater than the 45 mils height $h_b$ of the shunt bar 16) to provide mechanical clearance between the wheel and the corrugated sheet. The ridges have a pitch $P_w$ of 100 mils. The second welding phase of the two-phase process is represented in FIG. 3b which shows an upper flat sheet 14 being welded to the subunit comprising corrugated sheet 18 and lower flat sheet 20 between a pair of wheel electrodes 10, 12, and a high electrical conductivity current-carrier bar 32. When the current-carrier bar 32 is inserted between the wheel electrode 12 and the flat sheet 20 during welding, better quality weld regions 22 are produced and the shunt bars 16 are more readily removed from the sandwich structure upon completion of all welding. The shunt bars 16 which are in place in the alternate passages between the corrugated sheet 18 and the flat sheet 20, form the weld zones 22 along the interface between the flat sheet 14 and the corrugated sheet 18. It is apparent that the number of individual shunt bars handled during the described sequence is one-half of the number of weld seams formed.

Figure 4A:
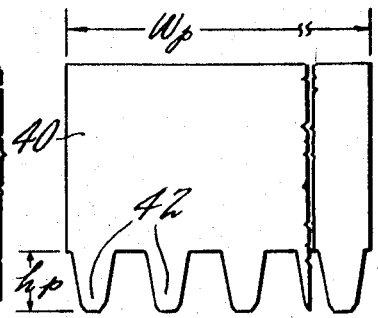
FIG. 4A is a front elevation view of a shunt bar plate in accordance with the present invention.
Figure 4B:
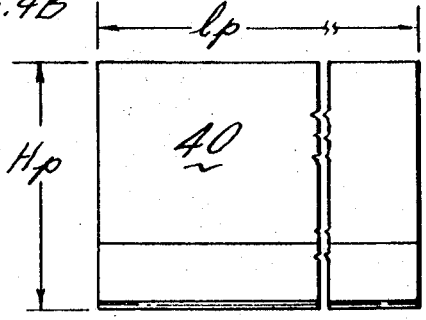
FIG. 4B is a side elevation view of a shunt bar plate in accordance with the present invention.

A shunt bar plate is a satisfactory alternative to the seam welding wheel. FIGS. 4A and 4B are front and side elevation views, respectively, of a shunt bar plate 40 having a width $w_p$ of 5 inches, a length $l_p$ of 7 inches and an overall height $h_p$ of 1¼ inches. The shunt plate 40 has ridges 42 which are of the same cross-sectional dimensions as the ridges 30 of the seam-welding wheel 10a. These dimensions have been selected to accommodate the welding of flat sheets having a thickness of 18 mils to corrugated sheets of 12 mils. If the dimensions of the sheet materials to be welded are varied, the dimensions of ridges 42 may correspondingly vary.

Figure 5:
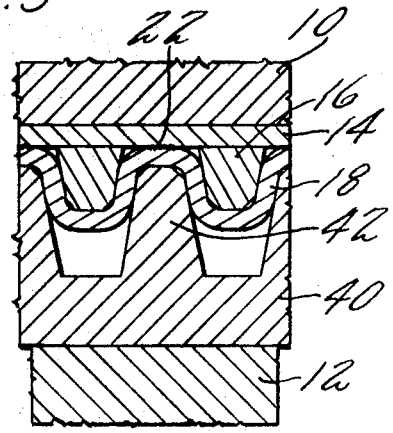
FIG. 5 is a partially broken-away, cross-sectional view through a slab of corrugated core and outer sheet being welded on a shunt bar plate between a pair of electrodes.

The use of the shunt bar plate 40 is shown schematically in FIG. 5. As the initial step, a subunit comprising a corrugated sheet 18 and an upper flat sheet 14 is welded between the electrodes 10, 12, the subunit being supported on the shunt bar plate 40. The second step requires welding an additional flat sheet to the exposed side of the corrugated core in a manner very similar to the second step of the process using the seam welding wheel and shown in FIG. 3B.

Figure 1B:
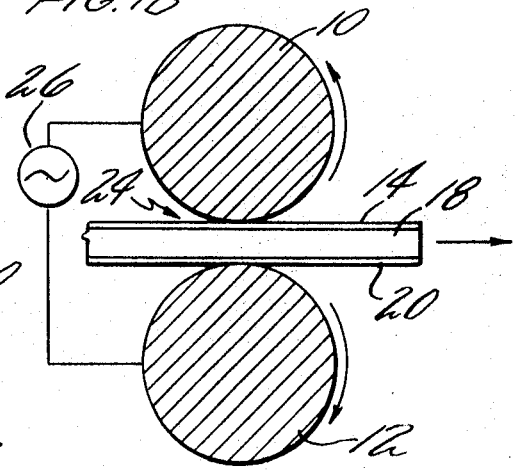
FIG. 1B is a schematic side elevation of a slab of sandwich structure passing between the rotating wheel electrodes in accordance with the present invention.

Metal sandwiches having a honeycomb core have been successfully manufactured by both the one-weld-phase and the two-weld-phase procedure. For example, the sandwich structure 24 shown in FIG. 1A has been fabricated in a single-step welding process. The sheets 14, 18 and 20 of Hastoloy X were arranged with copper shunt bars 16 in place and the entire structure passed between copper electrodes 10, 12 as illustrated in FIG. 1B. The electrodes were 10 inches in diameter and three-fourths inch in thickness. A compression force of 225 pounds was applied by the electrodes 10, 12 to the sandwich 24 which was advanced between the electrodes at a speed of approximately 5 inches per minute. The power source 26 provides an electric current of 20,000 amperes (measured on a Duffers Associates Model 281 current meter) at an electrical potential of approximately 3 volts. After welding was accomplished, the shunt bars 16 were removed from the sandwich 24 by a mechanical shaking and probing process. The two-weld-phase process was accomplished using the same general arrangement although the welding current during phase one was 8,200 amperes and during phase two 10,200 amperes. Whether welding is accomplished in one phase or two phases, the quality of the weld zones is kept under continual surveilance by random X-ray investigations of the weld area for cracks or voids and periodic destructive testing of structures coming from the production facility.

On occasion, the shunt bars have become wedged in place and chemical removal of the copper bars is accomplished by immersion of the sandwich 24 in a solution of 50 percent by weight water and 50 percent by weight nitric acid. During the welding procedure itself, cooling water is continuously sprayed across the work areas. Further, particularly when the seam-welding wheel 10a is used, the welding is done in an intermittent process consisting of a series of individual welds; generally each weld overlaps the previous weld to form a continuous-weld joint although the individual welds need not necessarily overlap. A typical intermittent weld consists of a series of discrete weld cycles which occur in rapid succession, each cycle being approximately 0.34 seconds in duration. During a weld cycle, the electrode wheels are advanced appropriately, the welding current flows (heating time) for approximately 0.05 seconds, and the current is then turned off (cooling time) for approximately 0.29 seconds. This procedure avoids excess heating of the welding electrodes and it has been found that intermittent welding does produce a better weld than is sometime produced in the continuous-weld process.

Although the joining process described was used to fabricate a sandwich of Hastoloy X the process need not be limited to this material. If the material is changed, certain adjustments which are apparent to those skilled in the welding art are necessary. For example, although copper electrodes have been used in joining Hastoloy X, the electrode material may have to be varied if the material to be welded has different physical characteristics. In the joining of Hastoloy X, it is necessary only that the pieces to be joined be brought together with the proper shunt bars in place and the entire assembly passed between a pair of electrodes providing sufficient electrical power of appropriate current and voltage.

Thorium-dispersed nickel, however, will not weld easily because of its electrical characteristics; thorium-dispersed nickel has a low electrical resistance and the molten zone formed during the welding process does not occur at the interface of the metals to be joined. This phenomenon is avoided by coating the thorium-dispersed nickel sheets to be welded with a material such as chromium having an appropriate electrical resistance to cause fusion at the interface region in subsequent fusion of the parts involved.

In addition to the complete welding and assembly of a final sandwich structure as described herein, it is possible to use the process disclosed to form a partial joining of a corrugated sheet between two enclosing flat sheets, and after removal of the shunt bars, passed the structure through a furnace heat treat process to complete the bonding at the weld zones which were created during the initial weld step of the joining process.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of my invention, that which I claim as new and desire to secure by letters Patent of the United States is:

1. A method of welding flat sheets of metal to corrugated sheet metal by continuous-weld seams to form rigid lightweight structures having smooth exterior surfaces and a honeycomb core wherein shunt bars are located between the flat and the corrugated sheets to provide paths for electric current through the core and to resist crushing of the core during welding comprising:

placing a corrugated core sheet in juxtaposition with a first flat outer sheet to form a subunit;

inserting into each enclosure formed between said corrugated sheet and said first flat sheet a trapezoidal-shaped bar which acts as an electrical shunt and also resists crushing of the surrounding enclosure curing welding, with the smaller of the parallel surfaces of said trapezoid adjacent to said corrugated sheet;

moving the subunit between a pair of first electrodes which applies a compressive force to the subunit, one of said pair of electrodes having a smooth surface and contacting said flat over a span of several adjacent weld seams, the other of said pair of electrodes having ridges along the surface thereof, said ridges being tapered and aligned to fit into accessible depressions in said corrugated sheet;

passing a first electric current between said first electrodes sufficient to cause continuous-weld seams between said corrugated sheet and said flat sheet in regions adjacent to said ridges;

placing a second flat outer sheet over the exposed side of the corrugated sheet of the subunit to form a unit;

moving said unit between a pair of second electrodes, which span several adjacent weld seams and applies a compressive force to the unit, each one of said pair of second electrodes having a smooth surface and contacting said upper and lower flat sheets respectively;

passing a second electric current between said second electrodes sufficient to cause continuous-weld seams between said corrugated and said flat sheets in a region adjacent to said shunt bars; and removing said shunt bars from said structure.

2. The method according to claim 1 in which said pair of first electrodes is maintained at an electrical potential difference of approximately 3 volts, apply a compressive force of 200 pounds on said subunit moving therebetween and pass a welding current of 8,200 amperes through said subunit, and said pair of second electrodes is maintained at an electrical potential difference of approximately 3 volts, apply a compressive force of 225 pounds on said unit passing therebetween and pass a welding current of 10,200 amperes through said unit.

3. The method according to claim 1 including, before the step of moving the unit between a pair of second electrodes, placing a current-carrier bar between said unit and the electrode adjacent therewith to more uniformly distribute the second electric current throughout the unit assembly as electric current passes between the electrodes thereby improving the weld and avoiding sticking of the shunt to the adjacent sheets.

4. The method according to claim 1 wherein at least one of the welds is made up of discrete individual overlapping welds.